United States Patent [19]
Roller et al.

[11] Patent Number: 5,934,798
[45] Date of Patent: Aug. 10, 1999

[54] LIGHT EMITTING DIODE LICENSE LAMP

[75] Inventors: Philip C. Roller, Ashville; Ronald D. Madison, Cherry Creek, both of N.Y.

[73] Assignee: Truck-Lite Co., Inc., Falconer, N.Y.

[21] Appl. No.: 08/968,175

[22] Filed: Nov. 12, 1997

Related U.S. Application Data

[60] Provisional application No. 60/038,947, Mar. 7, 1997.

[51] Int. Cl.⁶ .................................................. B60Q 1/56
[52] U.S. Cl. .......................... 362/497; 362/800; 362/230; 362/235; 362/496; 40/204
[58] Field of Search ..................................... 362/235, 240, 362/234, 230, 231, 249, 293, 800, 191, 497, 498, 499, 812, 496; 40/204, 205, 556

[56] References Cited

U.S. PATENT DOCUMENTS

| | | |
|---|---|---|
| 959,431 | 5/1910 | Holt ....................................... 362/83.2 |
| 1,151,401 | 8/1915 | Rousch ................................... 362/83.2 |
| 1,238,763 | 9/1917 | Harris ..................................... 362/83.2 |
| 1,408,726 | 3/1922 | Fagan ...................................... 362/83.2 |
| 1,481,101 | 1/1924 | Kowalak ................................. 362/83.2 |
| 4,733,335 | 3/1988 | Serizawa et al. ........................... 362/80 |
| 5,029,053 | 7/1991 | Solow . |
| 5,062,027 | 10/1991 | Machida et al. ........................ 362/80.1 |
| 5,067,057 | 11/1991 | Stapel ..................................... 362/83.2 |
| 5,408,772 | 4/1995 | Pettyjohn . |
| 5,700,080 | 12/1997 | Okuda ...................................... 362/80 |

*Primary Examiner*—Thomas M. Sember
*Attorney, Agent, or Firm*—The Bilicki Law Firm, P.C.

[57] ABSTRACT

A lamp assembly for illumination of a vehicle license plate includes a substrate, a plurality of light emitting diodes mounted on the substrate, and a lens for directing the light emitted from the light emitting diodes onto the license plate. A housing encases the substrate and the lens. An attachment member fixedly secures the housing to a vehicle displaying the license plate.

14 Claims, 3 Drawing Sheets

LIGHT EMITTING DIODE LICENSE LAMP

This application claims the priority of Provisional Application Ser. No. 60/038,947 entitled "Light Emitting Diode License Lamp" filed on Mar. 7, 1997.

FIELD OF THE INVENTION

This invention relates generally to light emitting diodes for use in external vehicle lighting, and, more particularly to light emitting diodes which emit white light for use in illuminating license plates.

BACKGROUND OF THE INVENTION

License lamps past and present all use incandescent lamps to produce white light to illuminate the license plate. Incandescent lamps have a finite life and are sensitive to vibration and mechanical shock. The illumination of the license plate is not uniform particularly where lens elements are used to distribute the light. What is needed, then, is an alternative; longer-life, vibration-resistant means of illuminating a license plate on a vehicle.

SUMMARY OF THE INVENTION

This invention broadly comprises a lamp assembly for illumination of a vehicle license plate comprising a substrate; a plurality of light emitting diodes mounted on the substrate; a lens for directing the light emitted from the light emitting diodes onto the license plate; a housing for encasing the substrate and the lens, and means for attaching the housing to the vehicle displaying the license plate.

DESCRIPTION OF THE PREFERRED EMBODIMENT

Figure 1:
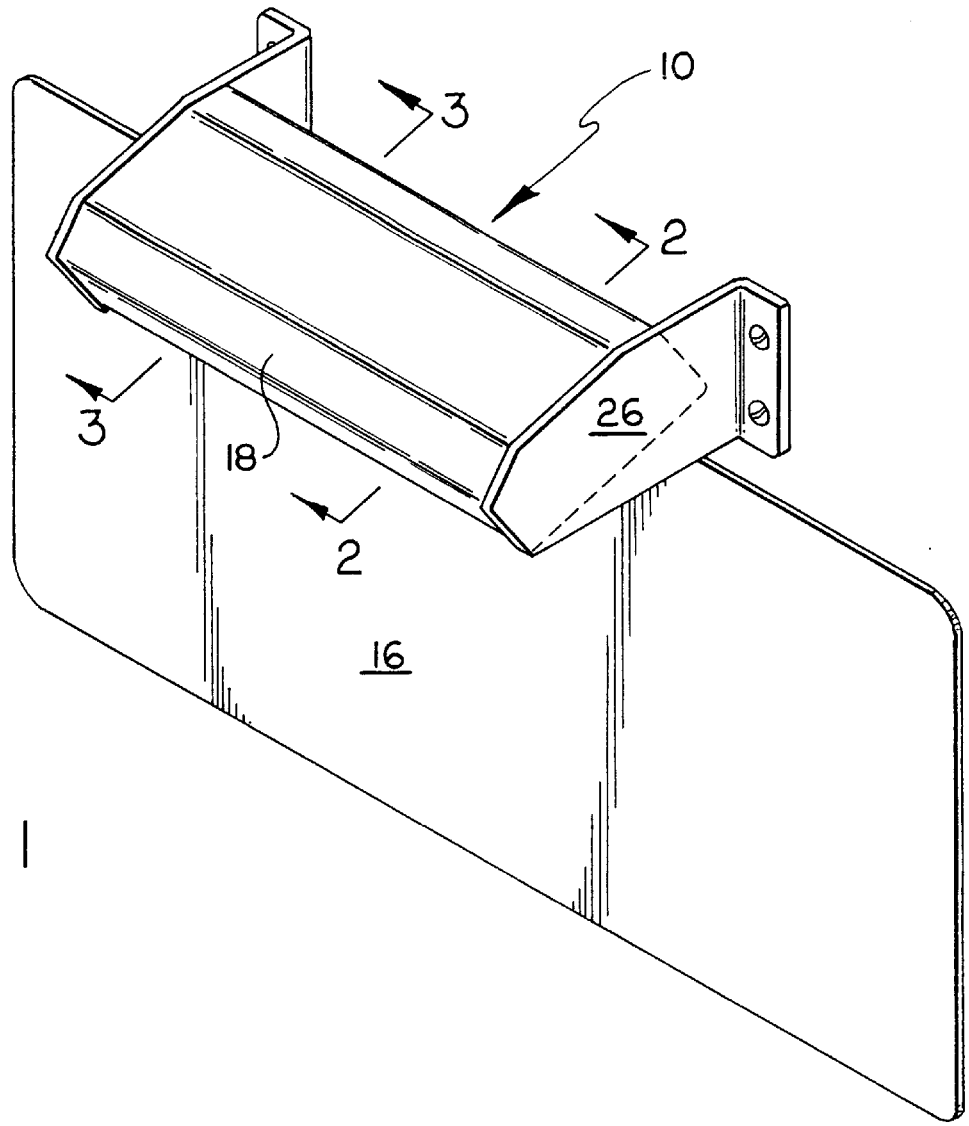
FIG. 1 is a perspective view of the license plate lamp assembly of the invention mounted above the license plate.
Figure 2:
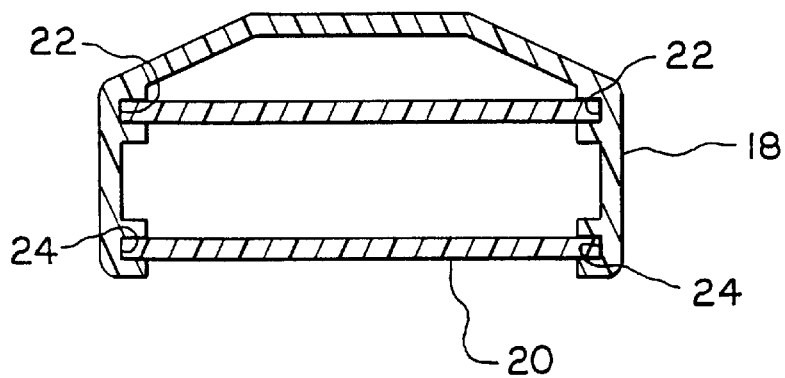
FIG. 2 is a cross-sectional view of the license plate lamp assembly of the invention with the LEDs removed.

The invention broadly comprises a license lamp utilizing an array of LED lamps which emit white light by means of a combination of LED junctions emitting light in blue wavelengths and phosphors embedded in the body of the LED, emitting white light, such as those produced by Nichia. As illustrated in FIG. 1, the license lamp 10 comprises LED lamps 12, in sufficient number to provide the required amount of illumination, mounted on a circuit board 14 in a manner that provides for the uniform distribution of light to the license plate 16. The circuit board also includes the circuitry necessary to provide the LED lamps with the proper drive voltages and protection from voltage transients. The circuit board assembly, as illustrated in FIG. 2, is encased in a housing 18 with a lens 20 which may be tinted to shift the color of the bluish white light, which is emitted from the LED lamps, toward the red range of the visible light spectrum, thus producing a white light which is capable of meeting the requirements of Federal Motor Vehicle Standards for white light. A reflector may be used over the LED lamp body to conceal the circuit board and to enhance the light output. Any reflector standard in the art, including but are not limited to, white card, plastic or metalized reflectors may be used. The lens may also have optical surfaces to control the direction of the light as required by applicable industry standards. The lamp is mounted by means of mounting brackets or integral mounting features. The lamps may be used singly or in multiples.

Figure 3:
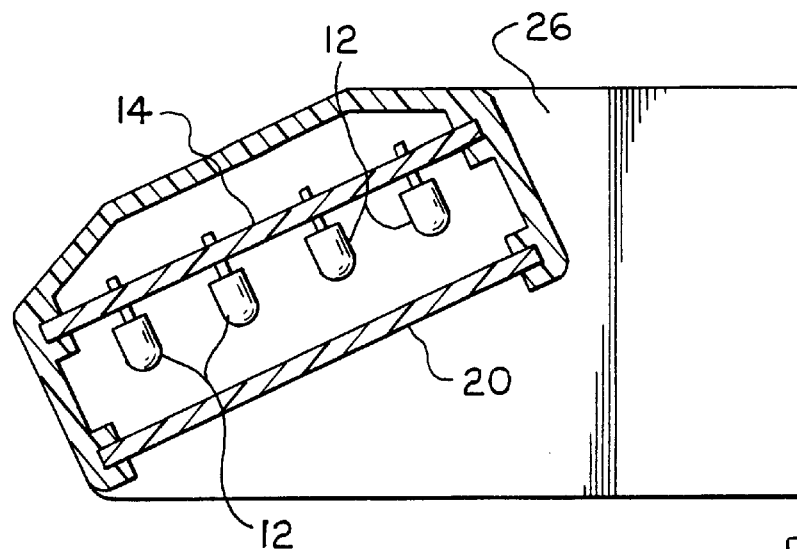
FIG. 3 is a vertical cross-sectional view of the license plate lamp assembly and mounting bracket of the invention as it would be mounted over the license plate.
Figure 4:
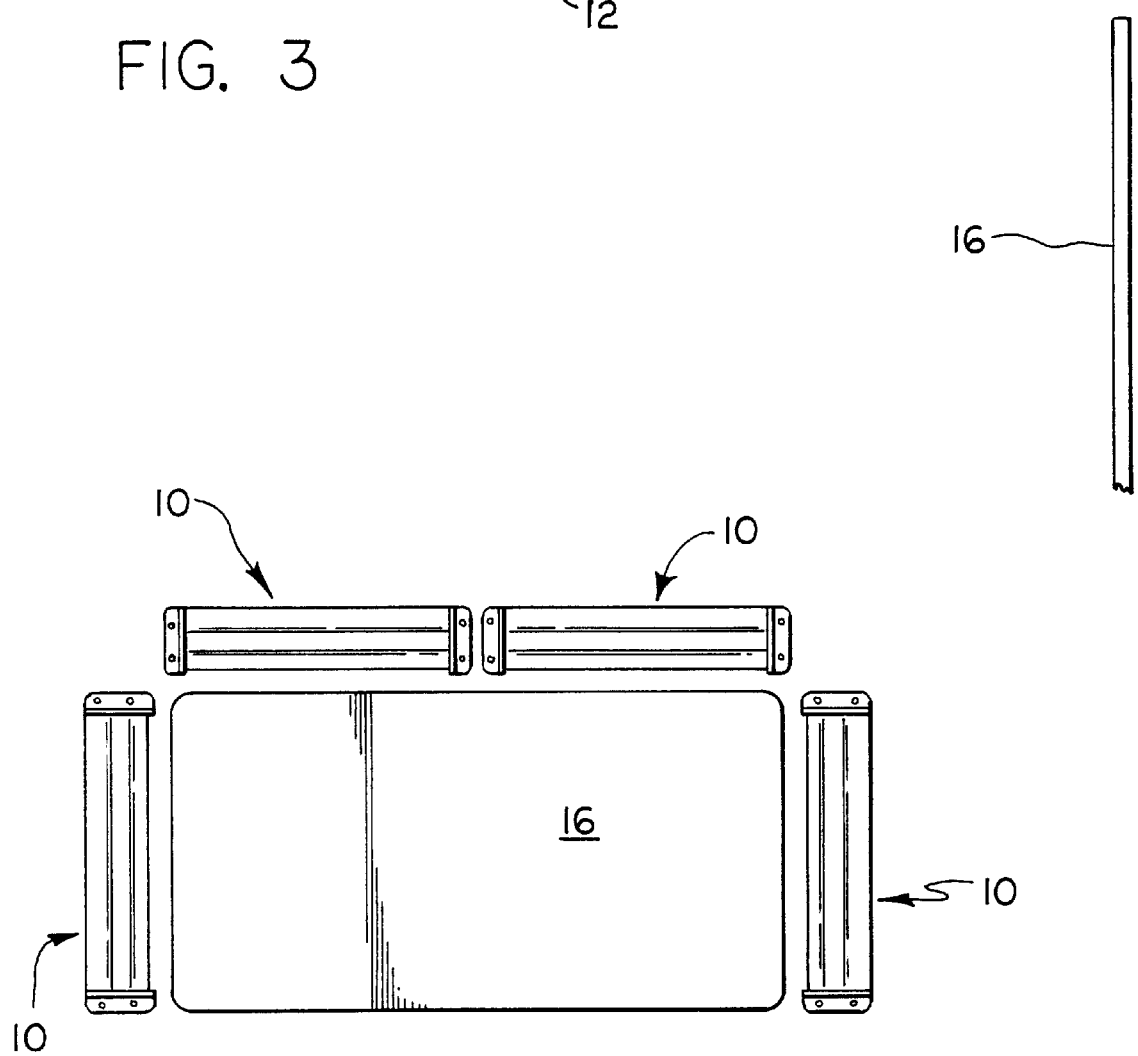
FIG. 4 is an alternative front view of a double lamp embodiment, showing the double lamps mounted either above the license plate or on the sides thereof
Figure 5:
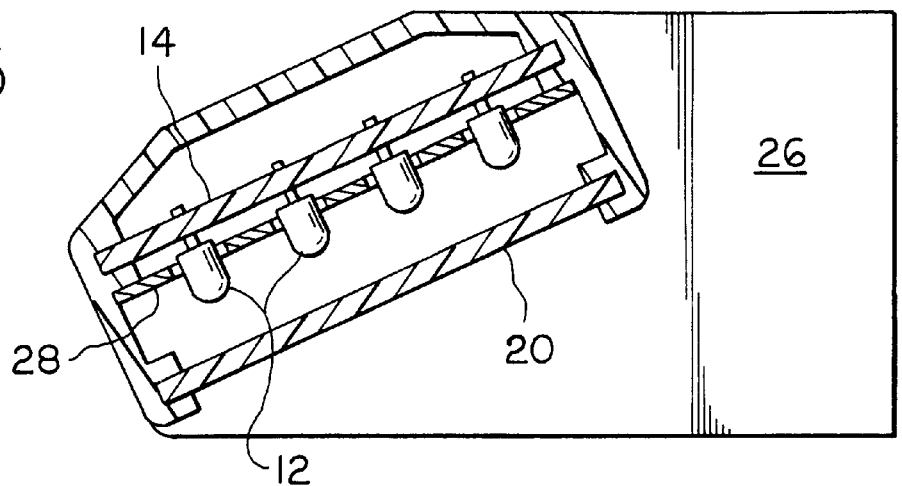
FIG. 5 is a vertical cross-sectional view of the license plate lamp assembly showing one arrangement of reflectors.
Figure 6:
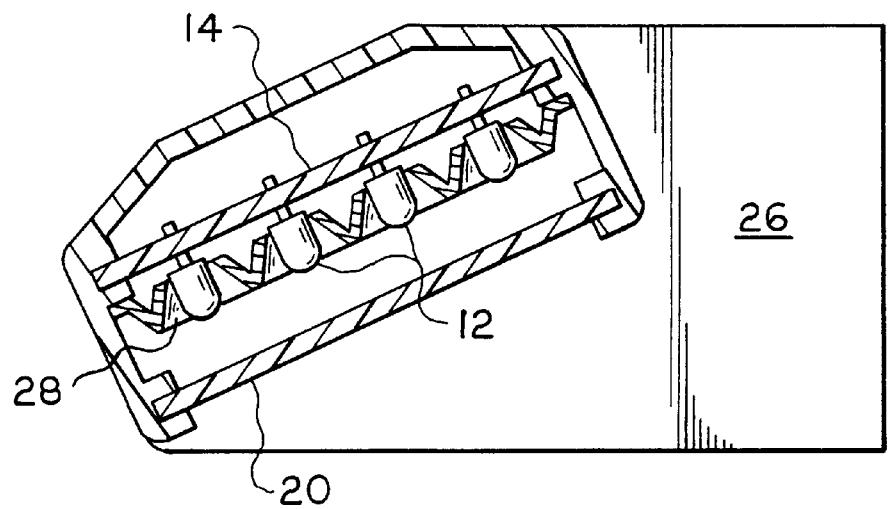
FIG. 6 is a vertical cross-sectional view of the license plate lamp assembly showing an alternate arrangement of the reflectors.

One embodiment of the invention is comprised of a housing in the form of an extruded plastic part with a pair of tracks 22 to accept a circuit board populated with a plurality of LED lamps, and voltage control circuitry mounted on the circuit board. Also, there are a pair of tracks 24 to accept lens 20. The lens may be equipped with optics on one or both surfaces to control the light distribution as required by applicable industry standards. As shown in FIG. 3, symmetrically opposite end plates 26 are sealed to the ends of the assembly. The end plates are capable of being mounted by a flange. The end plates also hold the lamp assembly at an appropriate angle to effectively illuminate license plate 16. The LED lamps are used alone or in pairs either above the plate or at each end, as illustrated in FIG. 4. Those skilled in the art will appreciate that it is possible to illuminate the license plate by arranging the LED lamps about or near the license plate other than as set forth herein and using lens optics to direct the light as desired. The entire LED lamp assembly is sealed to prevent the entrance of water. As shown in FIG. 5 and 6, reflector 28 may be positioned over LED lamps 12 to conceal circuit board 14 and to enhance the light output. The reflector may be flat as illustrated in FIG. 5 or horn or paraboloid shaped as illustrated in FIG. 6.

The circuit board is assembled, in one embodiment, using 20 LED lamps in a series parallel arrangement, ten paralleled series strings of two, and a three terminal adjustable regulator circuit which is set to produce a voltage that will produce the optimum operating current for the LED array. According to the present embodiment, the optimum operating current is 0.020 amps per string. In the instant embodiment, power is supplied by means of wires exiting through the housing. Alternatively, power can be supplied via an integral plug.

Alternative Embodiments

As those skilled in the art will readily appreciate, other arrangements of the circuit board are possible, as are other designs for the lens housing and mounting features. For example, other embodiments may include an injection molded housing and lens with mounting features integral to the housing. Additionally, other embodiments can include the use of one LED lamp assembly to illuminate the license plate rather than two as in the aforementioned embodiment. Furthermore, the LED lamp can incorporate the use of mirror like reflectors to direct the light to the license plate. Moreover, the LED lamp can employ more or fewer LED lamps to accomplish the same or similar functions.

What we claim is:

1. A lamp assembly for illumination of a vehicle license plate, comprising:

a substrate;

a plurality of light emitting diodes mounted on said substrate;

a lens for directing said light emitted from said light emitting diodes onto said license plate;

a housing for encasing said substrate and said lens; and, an attachment member that fixedly secures said housing to a vehicle displaying said license plate.

2. The assembly of claim 1, wherein the substrate is a circuit board.

3. The assembly of claim 1, wherein the light emitting diodes emit white light.

4. The assembly of claim 1, wherein the lens is tinted to shift the color of the emitted light towards white light.

5. The assembly of claim 1, wherein the lens has at least one optical surface.

6. The assembly of claim 1, further comprising a reflector to enhance light output from the light emitting diodes.

7. A lamp assembly for illumination of a vehicle license plate, comprising:

a substrate;

a plurality of light emitting diodes mounted on said substrate;

a lens for directing said light emitted from said light emitting diodes onto said license plate;

a housing for encasing said substrate and said lens; and, an attachment member that fixedly secures said housing to a vehicle displaying said license plate, wherein said housing contains a first pair of diametrically opposed channels and a second pair of diametrically opposed channels, said first pair of channels operatively arranged to hold said substrate and said second pair of channels operatively arranged to hold said lens, said lens forming a cover for said housing.

8. The assembly of claim 7, wherein the ends of the housing are sealed with a pair of endplates having flanges, said flanges operatively arranged for fastening the end plate to the vehicle displaying the license plate.

9. The assembly of claim 8 wherein the housing is fixed to the endplates at an angle so as to provide optimal illumination to the license plate.

10. The assembly of claim 7, wherein the substrate is a circuit board.

11. The assembly of claim 7, wherein the light emitting diodes emit white light.

12. The assembly of claim 7, wherein the lens is tinted to shift the color of the emitted light towards white light.

13. The assembly of claim 7, wherein the lens has at least one optical surface.

14. The assembly of claim 7, further comprising a reflector to enhance light output from the light emitting diodes.

* * * * *

(12) EX PARTE REEXAMINATION CERTIFICATE (7020th)
United States Patent
Roller et al.

(10) Number: US 5,934,798 C1
(45) Certificate Issued: Aug. 25, 2009

(54) LIGHT EMITTING DIODE LICENSE LAMP

(75) Inventors: Philip C. Roller, Ashville, NY (US); Ronald D. Madison, Cherry Creek, NY (US)

(73) Assignee: Truck-Lite Co., Inc., Falconer, NY (US)

Reexamination Request:
No. 90/007,020, Apr. 27, 2004

Reexamination Certificate for:
Patent No.: 5,934,798
Issued: Aug. 10, 1999
Appl. No.: 08/968,175
Filed: Nov. 12, 1997

Related U.S. Application Data

(60) Provisional application No. 60/038,947, filed on Mar. 7, 1997.

(51) Int. Cl.
*B60Q 1/56* (2006.01)
*B60Q 1/26* (2006.01)

(52) U.S. Cl. ............... 362/497; 362/800; 362/230; 362/235; 362/496; 40/204

(58) Field of Classification Search ........... 362/235, 362/240, 234, 230, 249, 293, 800, 191, 497, 362/498, 499, 812, 496; 40/204, 205, 556
See application file for complete search history.

(56) References Cited

U.S. PATENT DOCUMENTS

| | | | |
|---|---|---|---|
| 2,241,647 A | | 5/1941 | Simon |
| 2,241,741 A | | 5/1941 | Schmitt |
| 4,790,087 A | | 12/1988 | Hamada et al. |
| 5,062,027 A | | 10/1991 | Machida et al. |
| 5,067,057 A | * | 11/1991 | Stapel ............... 362/497 |
| 5,101,326 A | * | 3/1992 | Roney ............... 362/545 |
| 5,174,649 A | | 12/1992 | Alston ............... 362/244 |
| 5,463,280 A | * | 10/1995 | Johnson ............. 315/187 |
| 5,567,035 A | | 10/1996 | Dobler et al. ........ 362/66 |
| 5,575,459 A | * | 11/1996 | Anderson ........... 362/240 |
| 5,803,579 A | * | 9/1998 | Turnbull et al. ..... 362/516 |

OTHER PUBLICATIONS

License Plate Lamps (Rear Registration Plate Lamps)—SAE J587 OCT81; Clearance, Side Marker, and Identification Lamps—SAE J592 JAN84, *SAE Ground Vehicle Lighting* Manual, Society of Automotive Engineers, Inc., Mar. 1985, pp. 55–56, 74–75.

\* cited by examiner

*Primary Examiner*—Minh T Nguyen

(57) ABSTRACT

A lamp assembly for illumination of a vehicle license plate includes a substrate, a plurality of light emitting diodes mounted on the substrate, and lens for directing the light emitted from the light emitting diodes onto the license plate. A housing encases the substrate and the lens. An attachment member fixedly secures the housing to a vehicle displaying the license plate.

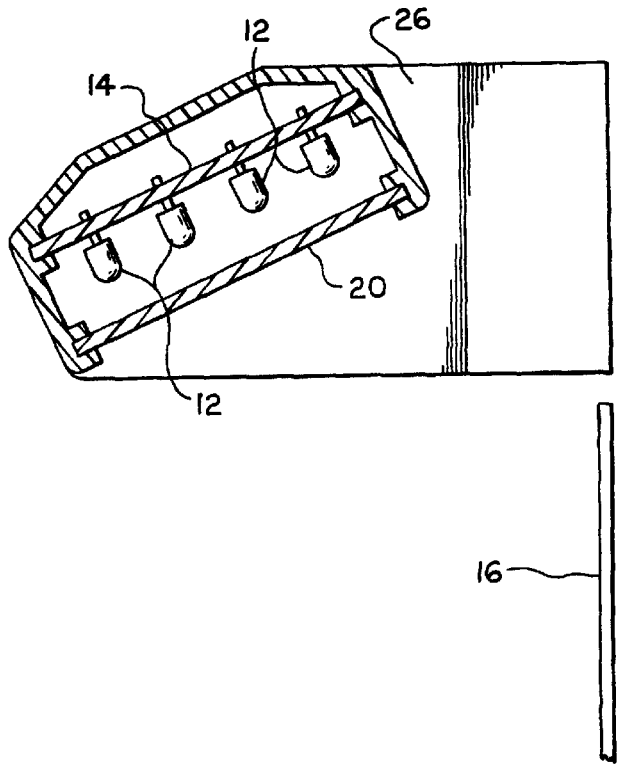

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3 and 11 are cancelled.

Claims 1, 7 and 8 are determined to be patentable as amended.

Claims 2, 4–6, 9–10 and 12–14, dependent on an amended claim, are determined to be patentable.

1. A lamp assembly for illumination of a vehicle license plate, comprising:
   a substrate;
   a plurality of light emitting diodes mounted on said substrate;
   a lens for directing said light emitted from said light emitting diodes onto said license plate;
   a housing for encasing said substrate and said lens; [and,]
   an attachment member that fixedly secures said housing to a vehicle displaying said license plate*; and*
   *wherein the light emitting diodes emit white light.*

7. A lamp assembly for illumination of a vehicle license plate, comprising:
   a substrate;
   a plurality of light emitting diodes mounted on said substrate;
   a lens for directing said light emitted from said light emitting diodes onto said license plate;
   a housing for encasing said substrate and said lens; [and,]
   an attachment member that fixedly secures said housing to a vehicle displaying said license plate, wherein said housing contains a first pair of diametrically opposed channels and a second pair of diametrically opposed channels, said first pair of channels operatively arranged to hold said substrate and said second pair of channels operatively arranged to hold said lens, said lens forming a cover for said housing*; and*
   *wherein the light emitting diodes emit white light.*

8. *A lamp assembly for illumination of a vehicle license plate, comprising:*
   *a substrate;*
   *a plurality of light emitting diodes mounded on said substrate;*
   *a lens for directing said light emitted from said light emitting diodes onto said license plate;*
   *a housing for encasing said substrate and said lens;*
   *an attachment member that fixedly secures said housing to a vehicle displaying said license plate, wherein said housing contains a first pair of diametrically opposed channels and a second pair of diametrically opposed channels, said first pair of channels operatively arranged to hold said substrate and said second pair of channels operatively arranged to hold said lens, said lens forming a cover for said housing; and*
   wherein the ends of the housing are sealed with a pair of endplates having flanges, said flanges operatively arranged for fastening the end plate to the vehicle displaying the license plate.

\* \* \* \* \*